United States Patent [19]
Youren

[11] Patent Number: 5,217,109
[45] Date of Patent: Jun. 8, 1993

[54] BRAKING SYSTEM FOR LIVE ROLLER CONVEYOR

[75] Inventor: Douglas Youren, Kidderminster, England

[73] Assignee: Link 51 Limited, Salop, England

[21] Appl. No.: 803,328

[22] Filed: Dec. 4, 1991

[30] Foreign Application Priority Data

Dec. 5, 1990 [GB] United Kingdom ............... 9026520

[51] Int. Cl.⁵ .............................................. B65G 13/06
[52] U.S. Cl. ..................................... 198/781; 198/790
[58] Field of Search ................................ 198/781, 790

[56] References Cited

U.S. PATENT DOCUMENTS

| | | | |
|---|---|---|---|
| 3,650,375 | 3/1972 | Fleischauer et al. | 198/790 |
| 3,696,912 | 10/1972 | Fleischauer et al. | 198/781 |
| 4,355,715 | 10/1982 | Chorlton | 198/781 |
| 4,588,073 | 5/1986 | Abell | 198/790 X |
| 4,819,788 | 4/1989 | Van Der Schie | 198/781 |

FOREIGN PATENT DOCUMENTS

| | | | |
|---|---|---|---|
| 1302967 | 1/1973 | United Kingdom . | |
| 2008525 | 6/1979 | United Kingdom | 198/790 |
| 2010207 | 6/1979 | United Kingdom . | |
| 2114084 | 8/1983 | United Kingdom . | |

*Primary Examiner*—Robert P. Olszewski
*Assistant Examiner*—Cheryl Gastineau
*Attorney, Agent, or Firm*—Wolf, Greenfield & Sacks

[57] ABSTRACT

Disclosed is a method and apparatus for braking a selected group of rollers in a live roller conveyor in which groups of rollers are driven by belts looped about a torque tube carried for rotation about a drive shaft and maintained in frictional contact therewith by the tension in the means belts. The brake means comprises a member carried on a pivotally mounted cam and movable between an "on" position in which the member is in contact with and applies pressure to the torque tube and an "off" position out of contact with the torque tube. In the "on" position the member applies pressure to the torque along a line radially of the drive shaft that cause the tube to move into a position in which it is coaxially aligned with the drive shaft whereby the frictional drive between the torque tube and the drive shaft is disengaged thereby bringing the rollers associated with the torque tube to a halt. The cam is caused to move the member between the "on" and "off" positions by a pneumatic motor actuated by a sensor downstream of the group of rollers indicating the accumulation of packages at the sensor.

13 Claims, 2 Drawing Sheets

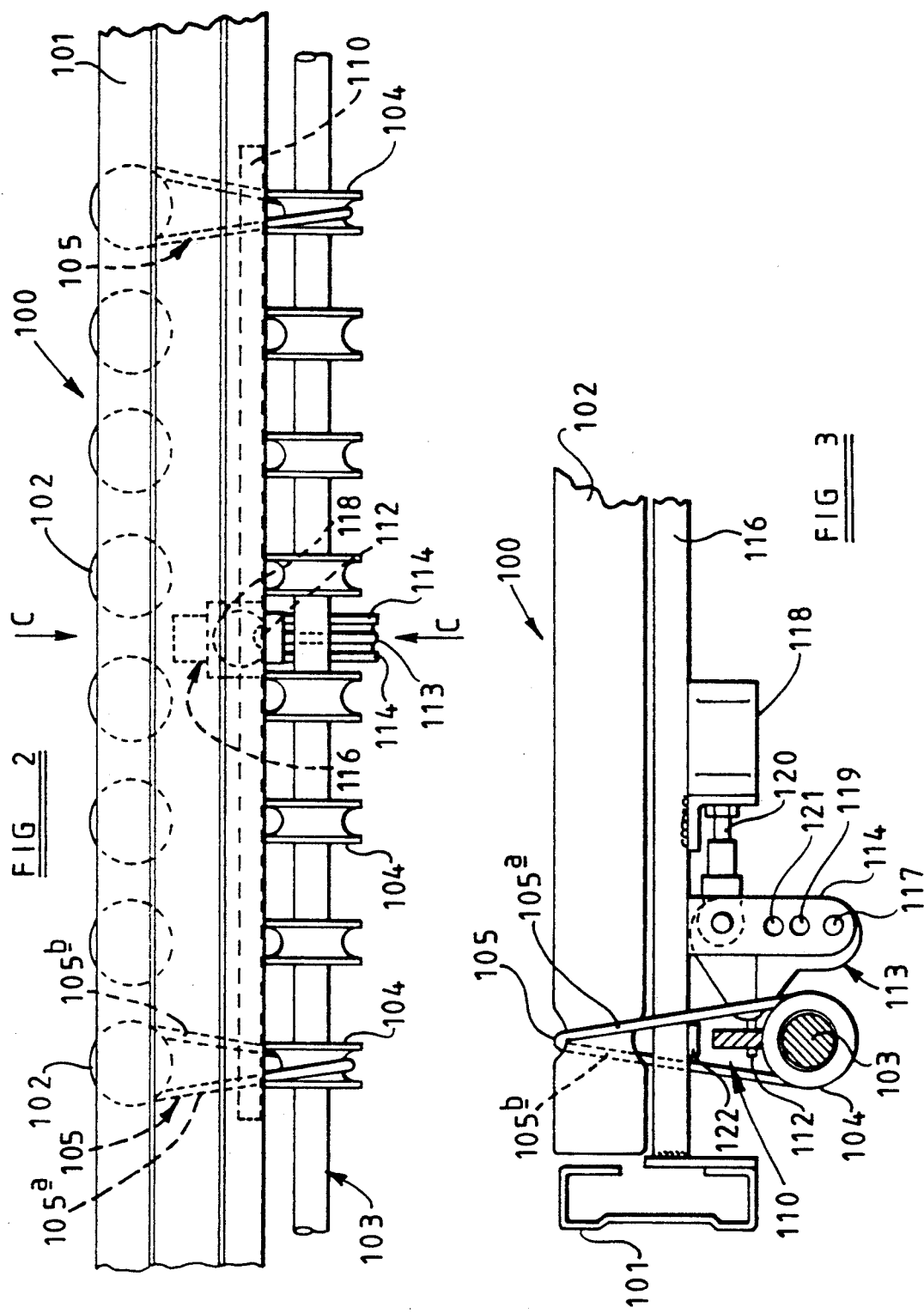

BRAKING SYSTEM FOR LIVE ROLLER CONVEYOR

BACKGROUND OF THE INVENTION

The present invention relates to live roller conveyors used to transport packages along the surface of the rollers and specifically to such conveyors having means for tracking rollers in response to an accumulation of packages.

Various methods and apparatus have been designed to avoid packages, being carried by a live roller conveyor, from accumulating and building up a high pressure when one of the packages is prevented from being forwarded, or when a par of the conveyor system is brought to a halt to enable packages to be removed.

One such method is described in United Kingdom Patent 2114084 in which drive to the rollers is by pulleys carried on a torque tube surrounding a driven shaft and rotated by frictional engagement therewith. Clamping means, substantially surrounding a portion of a torque tube, is activated by a brake assembly including a pneumatically operated trigger device to clasp the torque tube against movement and thereby to disengage the drive between the drive shaft and the rollers associated with the torque tube.

When have now developed an improved braking method for use in a roller conveyor system in which the rollers are driven by belts through a drive means which surrounds and frictionally engages a drive shaft. In systems of this kind the drive means is freely rotatably carried on the drive shaft and there is a degree of "play" between the said means and the shaft. In use the drive means is surged into frictional engagement with the drive shaft by the tension existing in the belts looped about the drive means and the driven rollers thus causing the axes of the drive means and drive shaft to lie along adjacent parallel lines, i.e. the axes are not coincident.

In the system described the drive means is preferably a torque tube which drives a plurality of rollers by belts looped about the roller shaft, a s described in GB-A-2010207. The drive means may, however, also comprise a plurality of spools located on the drive shaft, each spool acting to drive at single roller, as des ribbed in GB-A-1302967.

SUMMARY OF THE INVENTION

In our improved apparatus a means is provided to make contact with the drive means when braking is required in such a manner that the drive means is urged into a position where it axis is substantially coincident with the axis f the drive shaft (i.e. the drive mean and drive shaft are urged into a coaxial relationship) thereby reducing the frictional engagement between the drive means and the drive shaft to a level below that necessary to impart drive to the rollers associated with the drive means thus "stopping" the rollers associated with that drive means.

From one aspect, therefore, the invention provides a method for braking a selected group of rollers in a live roller conveyor system in which the drive rollers are each driven by a belt looped about an associated drive element surrounding a drive shaft and drawn into frictional engagement therewith by tension in the said belt, comprising applying to a member located adjacent the selected group of rollers, a force substantially equal to the tension in the belts looped about the said rollers and directed along a line normal to the axis of the drive means nd parallel to a line bi-secting the angle subtended by a drive belt form its associated roller to age the drive element into a position where its axis is substantially coincident with the axis of the drive shaft whereby the drive element is substantially out of frictional engagement with the drive shaft.

The force should be applied at a point along the drive element at which the combined tensions in the belts looped thereabout may be said to act, thus where the drive element is a torque tube driving a plurality of belts the force should be applied approximately half way along the length of the element.

From another aspect the invention provides a line shaft driven roller conveyor comprising:

a frame carrying a plurality of rollers defining a carrying surface, at least some of which rollers are driven;

drive means for driving the said rollers including a line shaft extending transversely of the rollers and carrying a plurality of drive elements located along its length, said drive elements surrounding the said drive shaft, and belt means looped about the drive elements and associated rollers and tensioned to draw the said drive elements into frictional engagement with the drive shaft whereby drive is transmitted to the rollers;

braking means for a selected groups of rollers, said braking means including;

a member having a portion positioned to move between a first positioning which it is out of contact with the drive element driving one or more of the selected group of rollers and a second position in which it makes contact with the drive element to apply a pressure to the surface of the drive element, which pressure is substantially equal to the tension in the drive belt or drive belts looped about the element and acts along a line normal to the axis of the drive element parallel to the line bisecting the angle subtended by the drive belt and its associated roller whereby the drive element is moved to a position substantially coaxial with the drive shaft thereby disengaging the frictional drive between the drive shaft and the drive element.

The drive mean may comprise a torque tube that acts to provide drive to a plurality of rollers and against which the said member applies pressure to disengage the drive, or a spool drawing a single roller, said member applying pressure to a selected group of said spools.

IN the arrangement in which the drive mean is a torque tube the said member may be positioned at one end of an arm or cam pivotally mounted on a frame member and moved between the said first and second positions by actuating mean acting in response to a signal from further means indicating the accumulation of packages on the downstream side of the conveyor system.

IN the arrangement in which the drive mean comprises spools, the said member may include two elements, a first rod element positioned parallel to the drive shaft and spaced from the spools when the said member is in the first position and a second element acting to move said first element between the said member first and second positions.

Actuating of the brake member is preferably by hydraulic or pneumatic means arranged to provide a predetermined pressure to the said member or by mechanical or electrical/magnetic means achieving the same effect.

BRIEF DESCRIPTION O THE DRAWINGS

Embodiments of the invention will now be described with reference to the accompanying drawings in which;

FIG. 2 is a diagrammatic representation of an elevation of a portion of a conveyor system using a second embodiment of a brake of the present invention illustrated in the "on" position, and FIG. 3 is a section through C—C of FIG. 2A.

DETAILED DESCRIPTION O THE PREFERRED EMBODIMENTS

Figure 1:
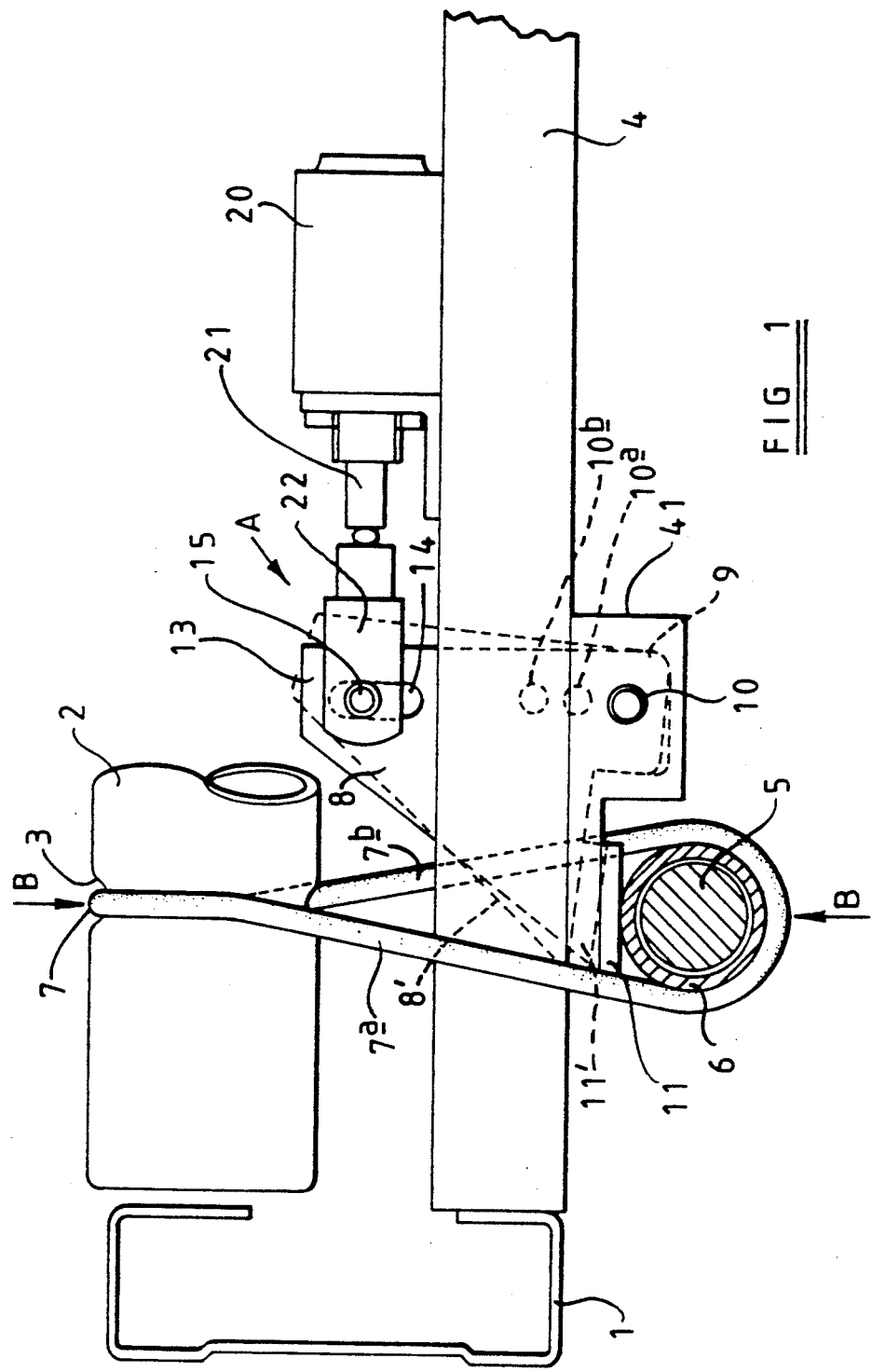
FIG. 1 is a diagrammatic representation of a part section through a portion of a conveyor system using a first embodiment of a brake of the present invention and illustrated in the "on" position.

A frame member 1 has a roller 2 journalled therein for free rotation (the opposite end of roller 2 is journalled in a corresponding frame member at the other side of the conveyor).

Rotating drive shaft 5 extends transversely to roller 2 and is driven by a motor (not shown). Shaft 5 carries a drive element in the form of a torque tube 6 which drives a discreet number of rollers. Drive to the roller is through a polyurethane belt 7 looped about torque tube 6 and engaged in groove 3 of roller 2.

the braking system, generally indicated at A, comprises a generally right triangular shaped cam plate 8 pivotally mounted in a vertical plane at corner 9 through pivot 10 passing between a pair of depending arms 41 of parallel transverses frame members cross member 4 secured at each end to frame member 1. A slotted hole 14 is formed in corner 13 of cam 8 substantially vertically above pivot 10. The mounting of cam 8 is such that corner 11 carrying a neoprene pad 11 overlies torque tube 6. When the brake is in the "on" position, as shown in the drawing, pressure is exerted by pad 11 on torque tube 6 along the line. B—B substantially normal to the axis of drive shaft 5 and parallel to a line bi-secting the angle formed by the arms 7a and 7b of belt 7.

Brake A is actuated by pneumatic cylinder 20 carrie don cross member 4 and containing a piston 21 at the end of which is secured a celvice 22 engaging corner 13 of cam 8 through pin 15 passing through slot 14.

In the conveyor system of which the drawing represents only portion of a single roller assembly, drive shaft 5 carries a number or torque tubes 6 each driving a discreet number of rollers 2. In normal drive conditions with brake A in the off position (as shown by dotted outline int h drawing), the tension in belts 7 draws the torque tubes 6 towards the drive shaft 5 and into frictional engagement therewith thereby causing the tube to rotate and providing drive to the rollers 2 via belts 7. In this condition the axes of drive shaft 5 and torque tube 6 are eccentric.

On receipt of a signal from a sensor indicating an accumulator of packages downstream of the brake shown in the drawing, pneumatic cylinder 20 is actuated forcing piston 21 forwards and causing cam 8 to pivot about pivot 10 and brining pad 11 to bear against torque tube 6 along the line B—B. The pressure exerted by cylinder 20 is arranged to be just sufficient to cause the torque tube 6 to move out of frictional engagement with drive shaft 5 and bring the axes of the torque tube and dive shaft substantially coincident. Since, in this condition, torque tube 6 will no longer be in frictional engagement with drive shaft 5, drive is no longer transmitted to the rollers 1 and any packages thereon remain stationary. When the downstream accumulation has been cleared a second signal to cylinder 20 releases the pressure on piston 21 which retracts thereby causing cam 8 to release the pressure on torque tube 6. The tension in belts 7 are then re-asserted drawing tube 6 back into frictional engagement with rotating drive shaft 5 to provide drive to rollers 2.

The degree of pressure required to achieve the above effect, i.e. to bring torque tube 6 coaxial with drive shaft 5, can be calculated from the known tensions in belts 7.

In this embodiment the piston and cylinder arrangement 20 and 21, which constitute a pneumatic motor, are arranged to provide a variable predetermined force on cam 8 and hence by pad 8 on torque tube 11. However the motor can be arranged to provide a fixed predetermined force on cam 8 and the pressure exerted by pad 11 on torque tube 6 set by selecting one of the several pivot points 10-10b formed in cam 8 (10a and 10b are shown in dotted outline in FIG. 1).

In order that the torque tube 6 is caused to move downwardly and out of frictional engagement with drive shaft 5 under the pressure of pad 11 of cam 8 in a uniform manner along its length, cam 8 is positioned to act along the effective line of tension created by belts 7. Thus if torque tube 6 is arranged to dive 6 equally spaced rollers then cam 8 would be positioned to apply a force to tube 6 at a point midway between rollers 3 and 4 of the group.

Referring to the second embodiment of the invention illustrated in FIGS. 2 and 3 of the drawings, a line roller conveyor generally indicated at 100 comprises a frame 101 carrying a plurality of freely rotatable rollers 102 journalled into the frame. A drive shaft 103 extends transversely of the frame and carries a plurality of freely rotatable spools 104 each associated with a single roller 102 which is driven by a tensioned polyurethane belt 105 looped about the roller and the spool. The tension in the belts 105 brings the spools 104 into frictional engagement with the drive shaft 103 thereby imparting drive to the rollers 102.

A brake means for disengaging the drive between the spool and the rollers consist of a rod member 110 extending parallel to the drive shaft 103 above spools 104 and between the runs 105A and 105B of belts 105. Rod 110 may be dimensioned to overlie any gi en number of spools 104; in the illustration it overlies 8 spools.

Rod 110 is supported midway along its length by a peg 112 that extends through a corresponding hole in the rod and is carried on a bell crank 113. Bell crank 113 is pivotally mounted at 117 between the downwardly extending arm as of a bracket 114 which is carried on a bridging member 116 extending across the frame 101 parallel to the rollers 102. Bell crank 113 is caused to move about pivot 117 by piston means 120 driven by a an hydraulic or pneumatic motor 118. Motor 118 is generally set to provide a given pressure to crank 113 on actuation; the pressure exerted by the rod 110 on the spools 104 being controlled by the selection of one of several pivot pints 117, 119, 121 in bracket 114; in the illustration pivot 117 is laced at the lowest point.

IN normal use the piston 120 of motor 118 is in the retracted position causing bell crank 113 to maintain rod 110 in contact with means 122 located on bridging member 116 whereby the rod is supported in a position parallel to the drive shaft 103. On receipt of a signal indicating a blockage of packages downstream of rollers 102, motor 118 is actuated and piston 120 moves outwardly of motor 118 to urge bell crack 113 about pivot 117 in an anti-clockwise direction to bring rod 110 into contact with the upper surfaces of spool 104. The pressure exerted by rod 110 is arranged to be just sufficient to act against the total tension in belts 105 to move the spools 104 out of frictional contact with drive shaft 103 and into a position substantially coaxial with drive shaft 103. Because the spool 104 are moved out of frictional contact with drive shaft 103 the drive to rollers 102 is disengaged and a package that is transferred onto rollers 102 will remain stationary until such time as motor 118 releases pressure from rod 110 and enables spools 104 to against make frictional contact with dive shaft 103 to provide drive to rollers 102.

A number of braking system will normally be provided along the conveyor length and activated by associated sensors. The sensor may be of any conventional type, e.g. they may be in the form of rollers lying proud of the conveyor surface, or photo cells.

I claim:

1. A method for braking a selected group of rollers in a live roller conveyor system in which at least a proportion of the rollers are driven by belts looped bout the rollers and an associated drive element surrounding a drive shaft and drawn into frictional engagement therewith by the tension in the said belts; comprising applying to the drive element a force to urge the drive element into a position where its axis is substantially coincident with the axis of the dive shaft whereby the drive element is moved substantially out of frictional contact of the drive shaft, thereby disengaging the drive between the drive shaft and drive element.

2. The method according of claim 1 wherein the rive element comprises a torque tube freely rotatably carried on the drive shaft and driving a plurality of associated rollers and the force is applied of the torque tube to cause the said tube to frictionally disengage from the drive shaft.

3. A method according to claim 1 wherein the drive element comprises spools freely rotatably carried on the drive shaft and the force is applied to a member extending parallel to the drive shaft to engage the surface of a plurality of said spools to frictionally disengage the said spools from the drive shaft.

4. A line shaft driven conveyor system comprising:
a frame carrying a plurality of rollers defining a carrying surface, at least some of which rollers are driven;
a drive means for driving the said rollers including a drive shaft extending transversely of the rollers and carrying a plurality of drive elements located along its length, said drive elements surrounding the said drive shaft and being freely rotatable thereabout and drive belts looped about the drive elements and associated rollers and tensioned to draw said drive elements into frictional engagement with the drive shaft whereby drive is transmitted to the rollers;
braking mean for a selected group of rollers, said braking means including:
a member positioned to move between a first position in which it is out of contact with the drive element or elements driven the selected group of rollers and a second position in which it makes contact with the said drive element or elements to apply a pressure to the surface thereof, which pressure is substantially equals to the total tension in the drive belts looped around the element or elements and acts along a line normal to a drive element and parallel to the line bisecting the angle subtended by the drive element at its associated roller, whereby the drive element is moved to a position substantially coaxial with the drive shaft thereby disengaging the frictional drive between the drive shaft and the drive element.

5. A conveyor system according to claim 4 wherein the drive means comprises a torque tube acting to provide drive to a plurality of said rollers and against which the said members applies pressure to disengage the drive when in its second position.

6. An apparatus according to claim 5 wherein the said member is positioned t one end of a cam mounted on a frame member for movement about a pivot between the said first and second positions.

7. An apparatus according to claim 6 wherein the actuating means is a pneumatic motor.

8. An apparatus according of claim 7 wherein upon actuation, the motor applies a predetermined force against said cam and the pressure applied by said member against the drive means is determined by the position of said pivot about which the cam is moved by the said motor.

9. An apparatus according to claim 4 wherein the drive elements comprises a plurality of spools each driving a single roller and said member applies pressure to a selected group of said spools.

10. Apparatus according to claim 9 wherein said member comprises tow elements, a first element positioned parallel to the drive shaft and lying between the runs of belts looped about the spools and the rollers and spaced from the spools when the said member is in its first position, and a second element acting to move said first element between the said members first and second positions.

11. An apparatus according to claim 10 wherein the second element comprises a crank mounted at one end to bracket secured to a conveyor frame member, and the other end of said crank includes means releasably engaging said first element whereby movement of the crank member about a pivot moves the first element between said member first and second positions.

12. An apparatus according to claim 11 wherein movement of said crank is controlled by a pneumatic motor.

13. An apparatus according of claim 12 wherein, upon actuation, said motor applies a predetermined force against said crank and the pressure applied by said first element against the drive means is determined by the position of said pivot about which said crank is moved by said motor.

* * * * *